(12) United States Patent
Brown

(10) Patent No.: US 7,107,938 B2
(45) Date of Patent: Sep. 19, 2006

(54) PET CHEW TOY WITH INTEGRALLY-FORMED FLAVOR POCKETS

(76) Inventor: Van H. Brown, 130 Springwood La., Andrews, NC (US) 28901

( * ) Notice: Subject to any disclaimer, the term of this patent is extended or adjusted under 35 U.S.C. 154(b) by 0 days.

(21) Appl. No.: 10/742,268

(22) Filed: Dec. 19, 2003

(65) Prior Publication Data

US 2004/0144331 A1 Jul. 29, 2004

Related U.S. Application Data

(60) Provisional application No. 60/435,638, filed on Dec. 19, 2002.

(51) Int. Cl.
*A01K 29/00* (2006.01)

(52) U.S. Cl. ............................... 119/710

(58) Field of Classification Search ........ 119/709–711; 426/805, 144; A01K 29/00
See application file for complete search history.

(56) References Cited

U.S. PATENT DOCUMENTS

| | | | |
|---|---|---|---|
| 2,988,045 A | 6/1961 | Fisher | |
| 3,441,001 A * | 4/1969 | Fisher | 119/709 |
| 3,962,751 A * | 6/1976 | Wagner | 452/142 |
| 4,555,408 A * | 11/1985 | Gregor et al. | 426/90 |
| D285,860 S * | 9/1986 | Muller | D1/106 |
| D302,622 S * | 8/1989 | Spanier | D1/106 |
| 4,924,811 A | 5/1990 | Axelrod | |
| 5,186,124 A * | 2/1993 | Woodford | 119/710 |
| 5,673,653 A | 10/1997 | Sherrill | |
| 5,832,877 A * | 11/1998 | Markham | 119/710 |
| 5,947,061 A * | 9/1999 | Markham et al. | 119/710 |
| 6,129,053 A | 10/2000 | Markham | |
| 6,178,922 B1 * | 1/2001 | Denesuk et al. | 119/710 |
| 6,277,420 B1 * | 8/2001 | Andersen et al. | 426/92 |
| D453,864 S * | 2/2002 | Olivares et al. | D30/160 |
| 6,546,896 B1 * | 4/2003 | Markham | 119/709 |
| D503,257 S * | 3/2005 | Jia et al. | D1/199 |
| 2002/0142079 A1 | 10/2002 | Chong | |

FOREIGN PATENT DOCUMENTS

CA 2270743 A 10/2000

OTHER PUBLICATIONS

Pet Product News, advertisement, Oct. 2002, p. 28.*
www.redbarninc.com/products/09/09roofles.html.*
www.allpetsconsidered.com/xp/aspx/pID.1034/id.1/catid.31.*

* cited by examiner

*Primary Examiner*—Teri Pham Luu
*Assistant Examiner*—Susan C. Alimenti
(74) *Attorney, Agent, or Firm*—Schwartz Law Firm P.C.

(57) ABSTRACT

A pet chew toy includes an animal skin substrate having first and second opposing major surfaces. At least one of the major surfaces defines a pattern of surface impressions. A flavor coating is applied to the substrate, and resides within interstices created by the surface impressions.

13 Claims, 2 Drawing Sheets

PET CHEW TOY WITH INTEGRALLY-FORMED FLAVOR POCKETS

TECHNICAL FIELD AND BACKGROUND OF INVENTION

This invention relates to an improved pet chew toy, and more specifically to a chew toy with flavor pockets designed to trap surface flavoring and to improve its adherence as the pet consumes the toy. The present chew toy includes a tough, dried or reformed rawhide, such as pork, bovine, fish, or reptile, that is especially appealing to both dogs and cats. Primary objects of the invention are to exercise the jaws, clean the teeth, and provide some measure of entertainment, which all contribute to the overall good health and longevity of the pet.

Rawhide pet chew toys/treats are well known and popular in the industry. The rawhide is generally processed in sheet form, and subsequently cut into small chips, rolled, twisted, or otherwise shaped as desired. Regardless of the selected shape, the surface texture of the rawhide is basically smooth.

During processing, the fat is typically removed from the rawhide to improve customer acceptance and decrease fat intake of the animal. This leaves a dry, tasteless and generally unappealing treat. In addition, the chemicals used in processing bovine hides can leave residual flavors and bitter tastes that further decrease the appeal to pets. To address this problem, some present commercial treats are basted to add flavor. However, because of their smooth surfaces, the inability to adhere high levels of flavor to the rawhide presents a further problem. When these chew toys are refused by the animal the chewing necessary to maintain healthy teeth and gums along with jaw exercise is substantially diminished.

The present invention addresses these and other problems of existing chew toys by effecting a mechanically-induced physical change in the surface texture of the rawhide. The resulting product is stretched from opposing top and bottom surfaces with shaped rollers or dies to yield a "waffle" texture. The impressions formed in the rawhide define flavor pockets which trap tasty surface flavoring and create additional surface area for flavor coating. The flavor pockets enable accumulation of much more flavor coating than could be applied to a smooth rawhide, and provide better adherence to retain the coating after drying. This added capacity for surface coating further allows the addition of vitamins and nutrients to the chew toy. Moreover, the waffle surface texture creates a thicker product appearance for better customer acceptance.

SUMMARY OF INVENTION

Therefore, it is an object of the invention to provide a pet chew toy which encourages the pet to aggressively chew for long periods of time until the toy is completely consumed.

It is another object of the invention to provide a pet chew toy which is highly palatable.

It is another object of the invention to provide a pet chew toy which exercises the jaws of the pet.

It is another object of the invention to provide a pet chew toy which effectively cleans the teeth and gums of the pet.

It is another object of the invention to provide a pet chew toy which satisfies the pet's natural urge to chew.

It is another object of the invention to provide a pet chew toy which effectively traps flavor within interstices created by surface texturing.

It is another object of the invention to provide a pet chew toy which offers increased surface area for flavor coating, thereby increasing the thickness of the toy but without increasing its outer perimeter dimensions.

These and other objects of the present invention are achieved in the preferred embodiments disclosed below by providing an improved pet chew toy. The chew toy includes an animal skin substrate having first and second opposing major surfaces. At least one of the major surfaces defines a pattern of surface impressions. A flavor coating is applied to the substrate, and resides within interstices created by the surface impressions.

The term "surface impressions" refers broadly herein to any random or patterned texturing of either major surface of the substrate.

The terms "skin" and "hide" are used interchangeably herein. The term "rawhide" refers to untanned animal skin/hide.

According to another preferred embodiment of the invention, the surface impressions create a waffle texture.

According to another preferred embodiment of the invention, the surface impressions are formed with each of the first and second major surfaces of the substrate.

According to another preferred embodiment of the invention, the surface impressions impress each major surface a distance greater than 1/16 inch.

According to another preferred embodiment of the invention, the substrate is formed of dried bovine hide.

According to another preferred embodiment of the invention, the substrate is formed of dried porcine hide.

According to another preferred embodiment of the invention, the substrate is formed of dried fish skin.

According to another preferred embodiment of the invention, the substrate is formed of processed and reformed hide.

Preferably, the flavor coating is a digest including a product selected from the group consisting of meat, poultry, and fish.

According to one preferred embodiment of the invention, the digest further includes a sweetener.

According to another preferred embodiment of the invention, the digest further includes a starch binder.

Preferably, the substrate comprises a tough, dried, and relatively flat chip.

BRIEF DESCRIPTION OF THE DRAWINGS

Some of the objects of the invention have been set forth above. Other objects and advantages of the invention will appear as the description proceeds when taken in conjunction with the following drawings, in which.

DESCRIPTION OF THE PREFERRED EMBODIMENT AND BEST MODE

Figure 1:
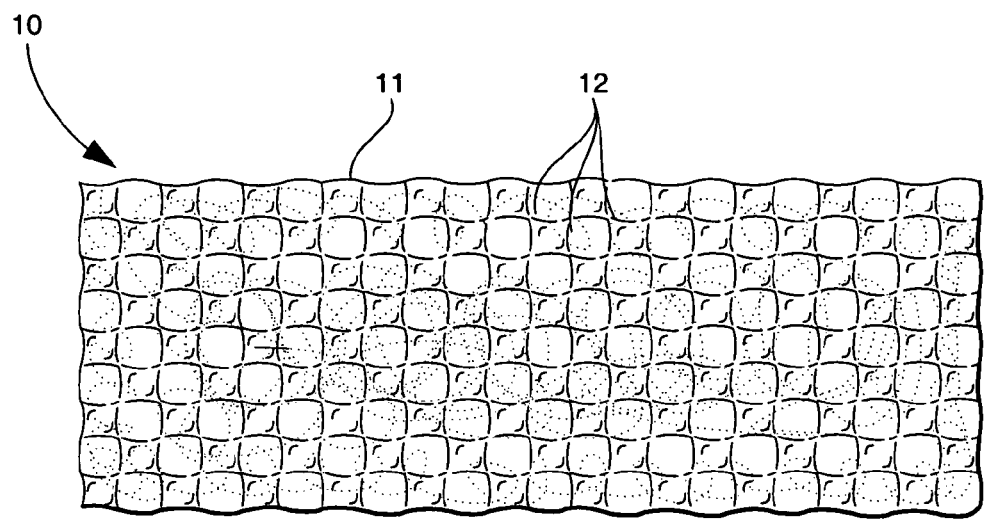
FIG. 1 is a top view of a pet chew toy according to one preferred embodiment of the present invention.

Referring now specifically to the drawings, a pet chew toy according to the present invention is illustrated in FIG. 1, and shown generally at reference numeral 10. The chew toy 10 comprises a tough rawhide substrate 11 with integrally-formed flavor pockets 12 designed to receive and capture surface flavoring. While a relatively flat rectangular chip is shown, the chew toy 10 may be formed in any desired shape, size, or configuration, such as rolls or twirls.

Initial Processing

The rawhide substrate 11 preferably comprises dried bovine or porcine hide, or fish skin, or may be a ground and reprocessed form of these skins. After cutting from the animal, the hide or skin is fleshed by mechanically scraping away any remaining fat and meat. After fleshing, for bovine hide, a chemical de-hairing process is undertaken to remove existing hair, and further reduce fat content. Following this procedure, the top or grain is cut away and used for leather while the bottom portion ("lime split") is de-limed and thoroughly washed. Porcine hides are usually de-haired during the slaughter process using hot water and mechanical scraping. After fleshing, the porcine hides are washed with a non-ionic detergent to reduce the fat level to 5–7%, and then thoroughly rinsed. For fish, such as salmon, the fleshed skins are likewise washed with low levels of non-ionic detergent and rinsed thoroughly.

Formation of Flavor Pockets 12

After initial processing, as described above, the skin substrate 11 is substantially de-watered using rubber squeeze rollers, cut to a desired size, and placed on a rack for controlled oven drying. The moisture content of the substrate 11 is slowly reduced to approximately 15–18%—preferably, until the substrate 11 is firm but not set hard.

Figure 2:
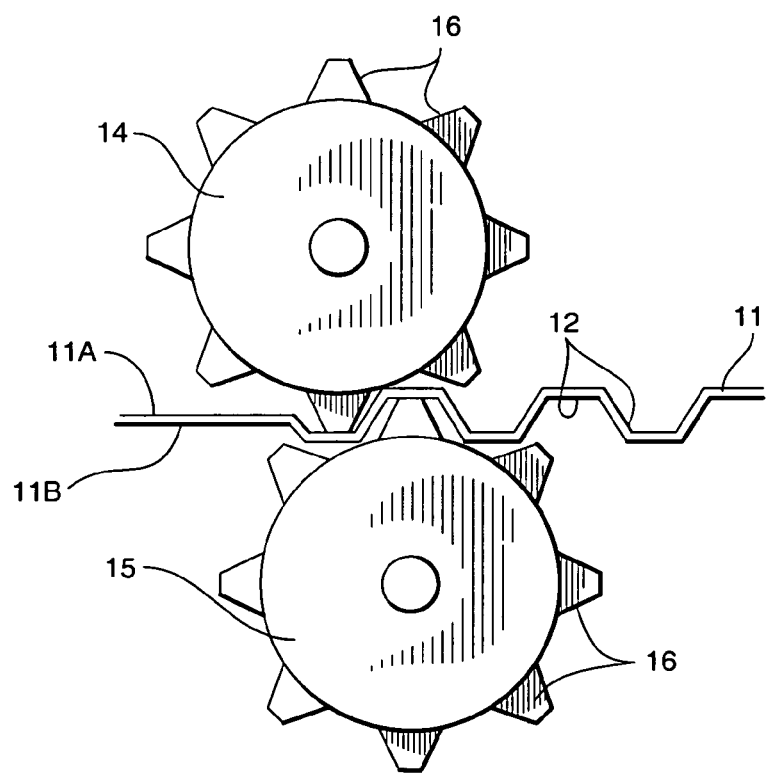
FIG. 2 is a side view demonstration operation of the roller assembly used to form surface impressions in the rawhide substrate.
Figure 3:
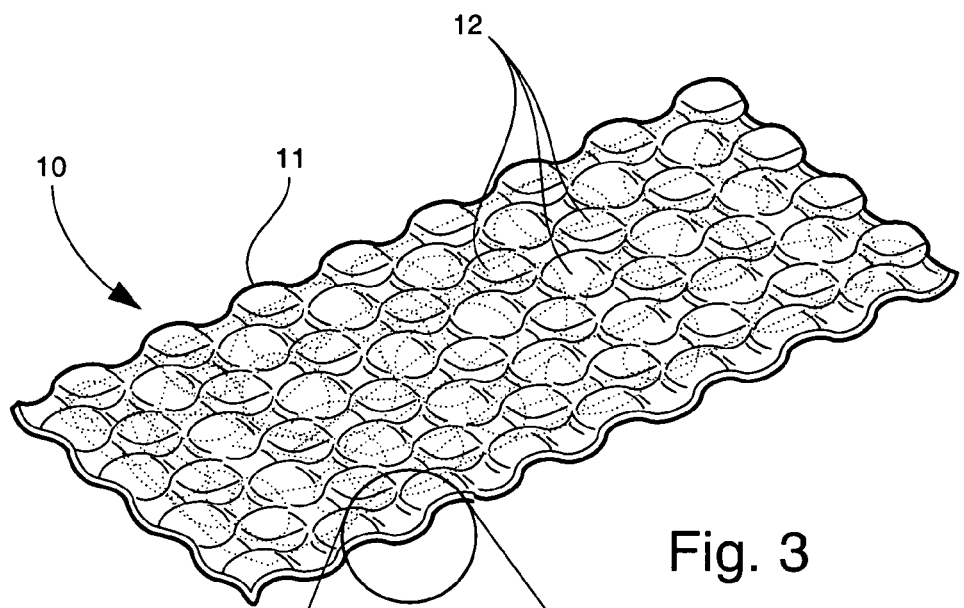
FIG. 3 is a perspective view of the pet chew toy.
Figure 4:
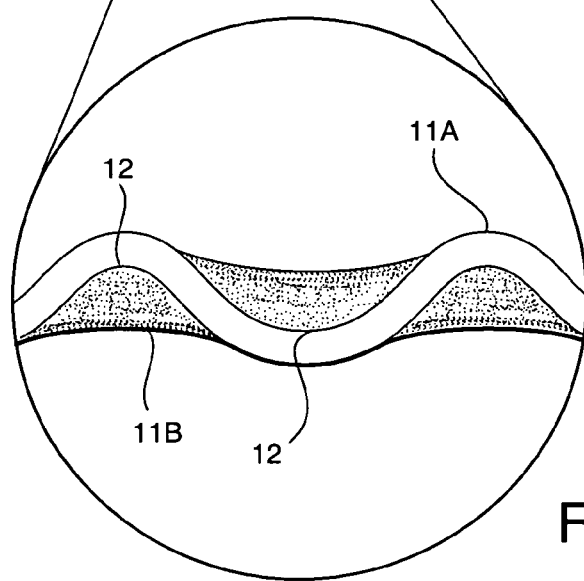
FIG. 4 is an enlarged, fragmentary view illustrating the flavor pockets formed in each opposing major surface of the rawhide substrate.

At this point, the substrate 11 is passed between top and bottom rollers 14, 15, as shown in FIG. 2, to stretch and form its opposing major surfaces 11A and 11B creating a patterned impression, or "waffle" texture. This surface texturing defines the flavor pockets 12. The roller protrusions 16 may be square, cylindrical, pyramidal, any other selected shape. In an alternative embodiment, the surface impressions are formed in a press die or by any other suitable mechanical means. The degree of surface impressions will vary depending on the flexibility and thickness of the skin substrate 11. For a typical pork skin chew toy, the surface impressions are preferably about 3/16" from each major surface.

After forming the flavor pockets 12, the rawhide substrate 11 is coated with a flavored formulation and returned to the oven for drying to a moisture content of about 7%. While a wide range of coatings can be used, the present formulation incorporates ingredients capable of surviving the long dehydration process and remaining highly palatable. The most successful formulation involves a digested meat or combination of meats and fish included in a sweet (sugar, molasses) base combined with starch binders. A typical digest formulation and its preparation are described below.

Preparation of Digest

A combination of 600 lbs pork hearts and 400 lbs poultry vicera is emulsified, the pH adjusted and an enzyme added. The combination is then heated in a hot water jacketed reactor with moderate mixing. Next, another enzyme is added to the mixture and allowed to digest with the temperature increased. Following the digestion time, the reaction is quenched. While hot, the mixture is then filtered through a stainless steel screen to remove any undigested products.

Preparation of Coating

Any meat, poultry, fish, or combination may be used to derive a digest, as described above, for use in the surface coating. Although typical coatings do have added color and may leave color stains on light carpet, the stains are similar to common pet food stains and are relatively easily removed. If desired, a clear non-staining coating may be used.

The coating flavor may be further enhanced with many different natural or synthetic flavor concentrates. This added flavoring can range from a simple smoke or garlic flavor to a commercially available concentrated cheese, chicken liver, or beef stew, such as those available from Feed Flavors, Inc. of Wheeling, Ill. Common flavor enhancers for commercial chew toys can range from a slightly sweet clear coating (5% added weight), to a heavy meat based coating with 20% added weight. A coating that results in a high sheen has exceptional appeal to both customers and pets. The coating may be applied by spraying, dipping, and roller coating techniques.

Once coated, the final product offers a highly flavored pet chew toy 10 which promotes the aggressive chewing necessary to exercise the jaws, clean the teeth, and entertain the pet. The flavor pockets 12 allow substantial accumulation of surface coating on the substrate 11, and operate to capture and retain the coating as the chew toy is consumed by the pet.

A pet chew toy is described above. Various details of the invention may be changed without departing from its scope. Furthermore, the foregoing description of the preferred embodiment of the invention and best mode for practicing the invention are provided for the purpose of illustration only and not for the purpose of limitation—the invention being defined by the claims.

I claim:

1. A pet chew toy, comprising:
   (a) a stretchable, flexible animal skin substrate comprising a single unitary component having first and second opposing major surfaces, said substrate defining a pattern of surface impressions in each of said first and second major surfaces, and said surface impressions creating a grid-like waffle texture; and
   (b) a flavor coating applied to said substrate, and residing within interstices created by said surface impressions.

2. A pet chew toy according to claim 1, wherein said surface impressions impress each major surface a distance greater than 1/16 inch.

3. A pet chew toy according to claim 1, wherein said substrate comprises bovine hide.

4. A pet chew toy according to claim 1, wherein said substrate comprises porcine hide.

5. A pet chew toy according to claim 1, wherein said substrate comprises fish skin.

6. A pet chew toy according to claim 1, wherein said flavor coating comprises a digest including a product selected from the group consisting of meat, poultry, and fish.

7. A pet chew toy according to claim 6, wherein said digest further comprises a sweetener.

8. A pet chew toy according to claim 7, wherein said digest further comprises a starch binder.

9. A pet chew toy, comprising:
(a) a stretchable, flexible animal skin substrate selected from the group consisting of bovine hide, porcine hide, and fish skin, and comprising a single unitary component having first and second opposing major surfaces;
(b) said substrate being stretched to form a pattern of surface impressions in each of said first and second major surfaces, said surface impressions impressing each of said first and second major surfaces a distance greater than 1/16 inch, and said surface impressions creating a grid-like waffle texture; and
(c) a flavor coating applied to said substrate, and residing within interstices created by said surface impressions.

10. A pet chew toy according to claim 9, wherein said flavor coating comprises a digest including a product selected from the group consisting of meat, poultry, and fish.

11. A pet chew toy according to claim 10, wherein said digest further comprises a sweetener.

12. A pet chew toy according to claim 11, wherein said digest further comprises a starch binder.

13. A pet chew toy according to claim 9, wherein said substrate comprises a relatively flat chip.

* * * * *